United States Patent [19]

Rawlyk

[11] Patent Number: 5,188,883
[45] Date of Patent: Feb. 23, 1993

[54] COMPOSITE TAPE STRUCTURES

[75] Inventor: Michael G. Rawlyk, Saskatoon, Canada

[73] Assignee: Northern Telecom Limited, Montreal, Canada

[21] Appl. No.: 709,469

[22] Filed: Jun. 3, 1991

Related U.S. Application Data

[62] Division of Ser. No. 498,257, Mar. 22, 1990, Pat. No. 5,039,197.

[51] Int. Cl.$^5$ .......................... B05D 1/36; B32B 7/12; B32B 7/14; B32B 33/00; B32B 15/08; C09J 7/02

[52] U.S. Cl. ................................ 428/189; 174/23 R; 174/23 C; 174/107; 359/100; 359/115; 385/107; 427/258; 427/284; 427/287; 427/375; 427/409; 428/194; 428/200; 428/344; 428/349; 428/913

[58] Field of Search ............... 428/189, 194, 200, 349, 428/344, 913; 427/258, 284, 287, 375, 409; 174/23 R, 23 C, 107; 385/107

[56] References Cited

U.S. PATENT DOCUMENTS

| | | | |
|---|---|---|---|
| 2,224,189 | 10/1940 | Leslie | 428/194 |
| 3,574,109 | 4/1971 | Yoshikawa | 428/189 |
| 3,770,556 | 11/1973 | Evans et al. | 428/194 |
| 4,323,721 | 4/1982 | Kincaid et al. | 428/189 |
| 4,324,827 | 4/1982 | Obayashi et al. | 428/194 |
| 4,327,246 | 4/1982 | Kincaid | 428/189 |
| 4,421,807 | 12/1983 | Clausing | 428/194 |
| 4,595,431 | 6/1986 | Bohannon et al. | 174/107 |
| 4,606,957 | 8/1986 | Cohen | 428/194 |
| 4,767,184 | 8/1988 | Ogasawara et al. | 174/23 R |
| 4,778,700 | 10/1988 | Pereira | 428/194 |
| 4,842,908 | 6/1989 | Cohen et al. | 428/194 |
| 4,874,219 | 10/1989 | Arroyo et al. | 385/107 |
| 4,956,523 | 9/1990 | Pawluk | 174/107 |
| 4,963,695 | 10/1990 | Marciano-Agostimelli et al. | 174/23 R |
| 5,010,209 | 4/1991 | Marciano-Agostinelli et al. | 174/23 R |
| 5,013,127 | 5/1991 | Bernard | 385/107 |
| 5,023,395 | 6/1991 | O'Connor | 428/189 |
| 5,043,538 | 8/1991 | Hughey et al. | 174/107 |
| 5,077,449 | 12/1991 | Cornibert et al. | 174/107 |
| 5,082,719 | 1/1992 | Arroyo | 385/107 |

Primary Examiner—James C. Cannon
Attorney, Agent, or Firm—R. J. Austin

[57] ABSTRACT

A composite tape structure having a metal tape layer and a layer of swellable water blocking material, the two layers bonded together face-to-face. The tape structure is for use as a composite shield and water blocking structure surrounding the core of a cable, preferably a telecommunications cable. One edge region of the metal tape layer may extend beyond the layer of water blocking material so that overlapping edges of the metal tape layer confront each other for bonding purposes when used as a shield. The layer of water blocking material may be formed from tape impregnated with or provided with a particulate swellable material, or the particulate material may be applied directly to and bonded to the metal tape layer.

7 Claims, 5 Drawing Sheets

COMPOSITE TAPE STRUCTURES

This invention is a divisional application of application Ser. No. 498,257 filed Mar. 22, 1990, now U.S. Pat. No. 5,039,197, in the name of Michael G. Rawlyk and entitled "Cable and Tape Structures Therefor" and relates to composite structures.

In the manufacture of power and telecommunications cables, a core of the cable is normally surrounded by a metal field which is, in turn, covered by an extruded polymeric jacket. In certain of these constructions, it has recently become known to locate a tape layer of swellable water blocking material between the metal shield and the core, this tape layer being provided by a tape of the swellable material which is wrapped around the core in an in-line operation and before the shield is added. In the manufacture of this tape structure, because the water blocking material has substantially no rigidity, a binder tape needs to be wrapped around the tape layer of water blocking material immediately after it has been applied around the core so as to hold it in position before the wrapping of the shield around the water blocking material. Hence, the use of a tape layer of swellable water blocking material has necessarily included extra processing steps and apparatus for the application of the binder together with attendant additional costs. In addition, by using the binder tape, the percentage "downtime" in use of the manufacturing process is potentially increased because of probable breakage of the binder tape. Binder tape breakage also tends to increase the amount of cable wastage.

The present invention provides a tape in the use of which, for the manufacture of cable, a composite binder tape structure may be avoided while producing water blocking material underneath the shield. The invention also provides a method of making the inventive composite tape structure method.

According to one aspect of the present invention there is provided a composite tape structure comprising a metal tape layer and a layer of swellable water blocking material, the two layers bonded together with the layer of swellable water blocking material extending along one side surface of the metal tape layer.

The composite tape structure of the invention as defined above, may be applied to a cable core to provide the swellable water blocking material and the shield and is applied in a single operation with the swellable material supported by the metal layer, before, during and after application. Hence, the swellable water blocking material and the shield are applied simultaneously around the cable and a binder tape is thus not required for holding the swellable material in position. Any disadvantages which would be inherent in the use of a binding tape are thereby avoided. The swellable material is preferably provided as a tape layer and the metal tape layer and water blocking tape are bonded together. An adhesive may be provided upon the one side surface of the metal tape layer. Alternatively, the metal tape layer has a thermoplastic coating on the one side surface, the thermoplastic coating being softened to provide an adhesive.

In a preferred construction, the metal tape layer is provided on one side surface with a thermoplastic coating extending continuously along one longitudinally extending edge region of the metal tape layer and on the other side surface with a thermoplastic coating extending continuously along the other edge region, and the one edge region of the metal layer extends laterally beyond the tape layer of swellable water blocking material so that the thermoplastic coating is unobscured on said one longitudinally extending edge region. Thus, when the composite tape structure is wrapped around the core of a cable to provide a composite shield and a water blocking structure and with the shield layer on the outside of the water blocking layer, the two edge regions of the metal tape layer may be caused to overlap and the thermoplastic coatings to fuse together by the application of heat such as when extruding jacket material onto the shield.

It is also preferable that the composite tape structure according to the invention has laterally extending corrugations lying side-by-side longitudinally of the tape.

According to another aspect of the present invention there is provided a method of making a composite tape structure comprising providing a metal tape layer and a swellable water blocking material and causing a bond between the metal tape layer and the water blocking material with the water blocking material extending along and providing another layer on said one side surface of the metal tape layer.

The layer of water blocking material may be provided by a tape layer which is laid against and bonded to the metal tape layer or by a powdered form of the swellable water blocking material which is applied along the one surface of the metal tape layer.

Embodiments of the invention will not be described, by way of example, with reference to the accompanying drawings, in which.

In the manufacture of a telecommunications cable, whether this cable be an electrical cable or an optical cable, a cable core is normally surrounded by a metal shield and this, in turn, is surrounded by a polymeric jacket. In cases where it is deemed desirable to apply a swellable water blocking material between the shield and the cable core, the water blocking material is applied as a tape layer which is wrapped around the cable core before a metal tape layer is wrapped around the core for forming the metal shield. Because the swellable water blocking tape layer is extremely flimsy and non-rigid in nature, it is essential to wrap at least one binding tape helically around the layer of swellable water blocking material to hold it in its desired position around the core before application of the metal tape layer.

Figure 1:
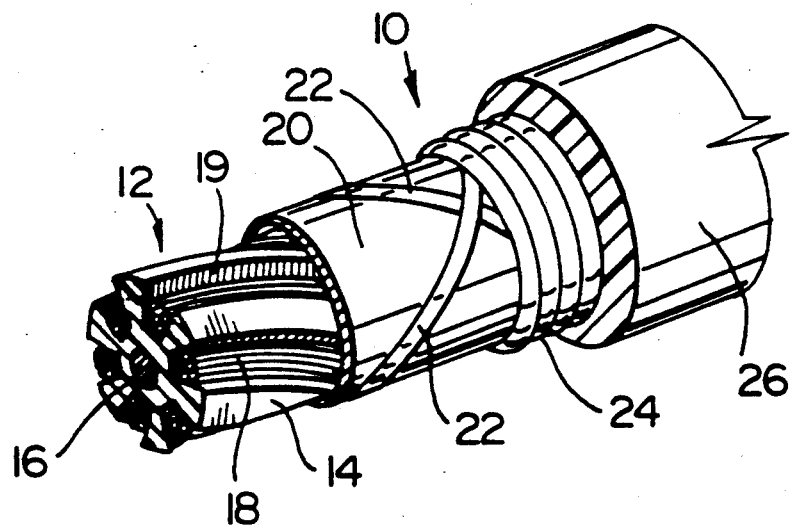
FIG. 1 is an isometric view of part of a sectioned prior art cable.

This is illustrated in the prior art construction shown in FIG. 1 which represents an optical cable 10. The optical cable 10 has a core 12 composed of an elongate plastic extruded core member 14, a longitudinally extending tensile reinforcing means which may be a central strength member 16, and transmission elements housed in helically extending grooves 19 formed around the outside of the core member 14. These transmission elements are either groups of optical fibers directly inserted into the grooves or alternatively, comprise flexible plastics tubes 18, as shown held within the grooves, the plastics tubes containing groups of optical fibers. A water blocking material which may comprise a grease or jelly water blocking substance, or a swellable water blocking powder surrounds the transmission elements within the grooves.

Surrounding the core 12 in this prior construction is a tape layer of swellable water blocking material 20 having longitudinally extending edges which abut or overlap one over the other. This tape layer is surrounded by one or possibly two helically extending binding tapes 22 and around the tape layer 20 is a corrugated metal shield 24. Immediately surrounding the metal shield is an extruded polymeric jacket 26.

Figure 2:
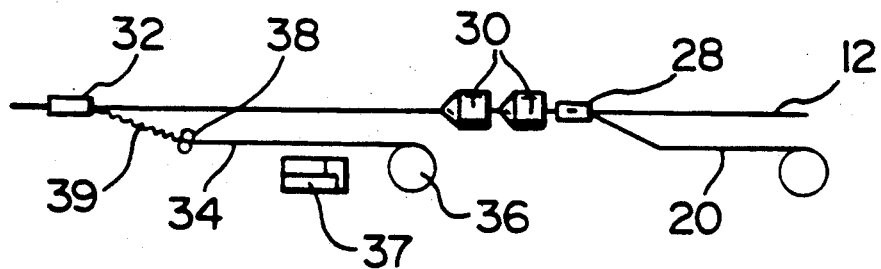
FIG. 2 is a diagrammatic side elevational view of apparatus used in the manufacture of the prior art cable of FIG. 1.

The cable 10 is manufactured partly by the use of the apparatus shown in FIG. 2. As shown by FIG. 2, the core 12 is moved along a passline, through tape forming apparatus 28 at which the layer 20 of swellable water blocking tape is applied around the core, axially through two binding heads 30, to apply the binding tapes 22, and then through a further tape forming apparatus 32 at which the shield 24 is provided. The shield is provided by a flat metal tape 34 issuing from a reel 36, the tape 34 passing across a welder 37 for welding together tapes from successive reels. The tape 34 passes through corrugating rolls 38 to be formed with laterally extending and longitudinally spaced corrugations as shown at 39 in FIG. 2.

With the method of making the prior art cable, the binding heads 30 and the reeled binding tape add to the cost of manufacture of the cable. Further to this, binding tapes are known to break, sometimes frequently during operation. Such breakage adds to the cost of manufacture of a cable and also adds to the time required for its manufacture. Binding tape usage is therefore highly inconvenient and is expensive.

As will be seen from the embodiments of the invention now to be described, the use of a binding tape around swellable water blocking material is avoided.

Figure 3:
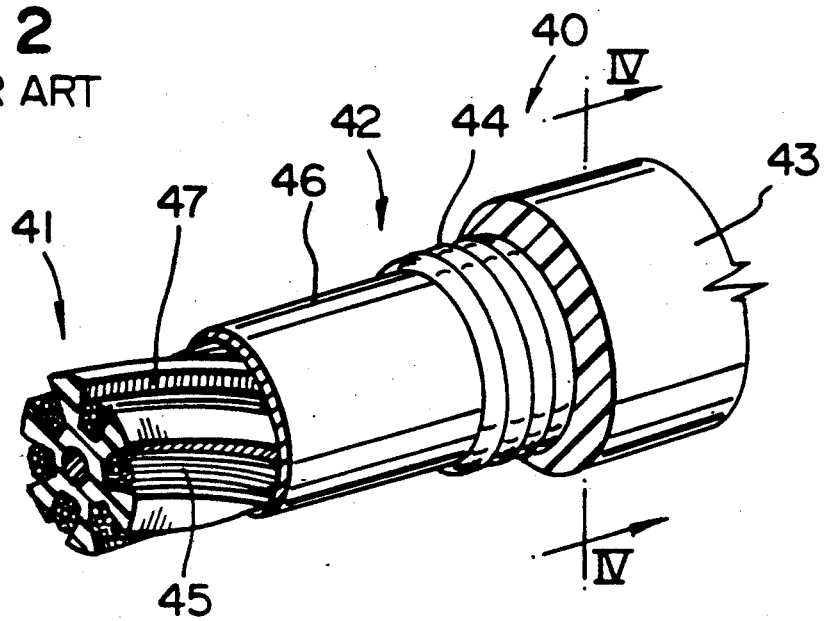
FIG. 3 is an isometric view of part of a sectioned cable using a composite tape structure according to a first embodiment as a composite shield and water blocking tape structure.
Figure 4:
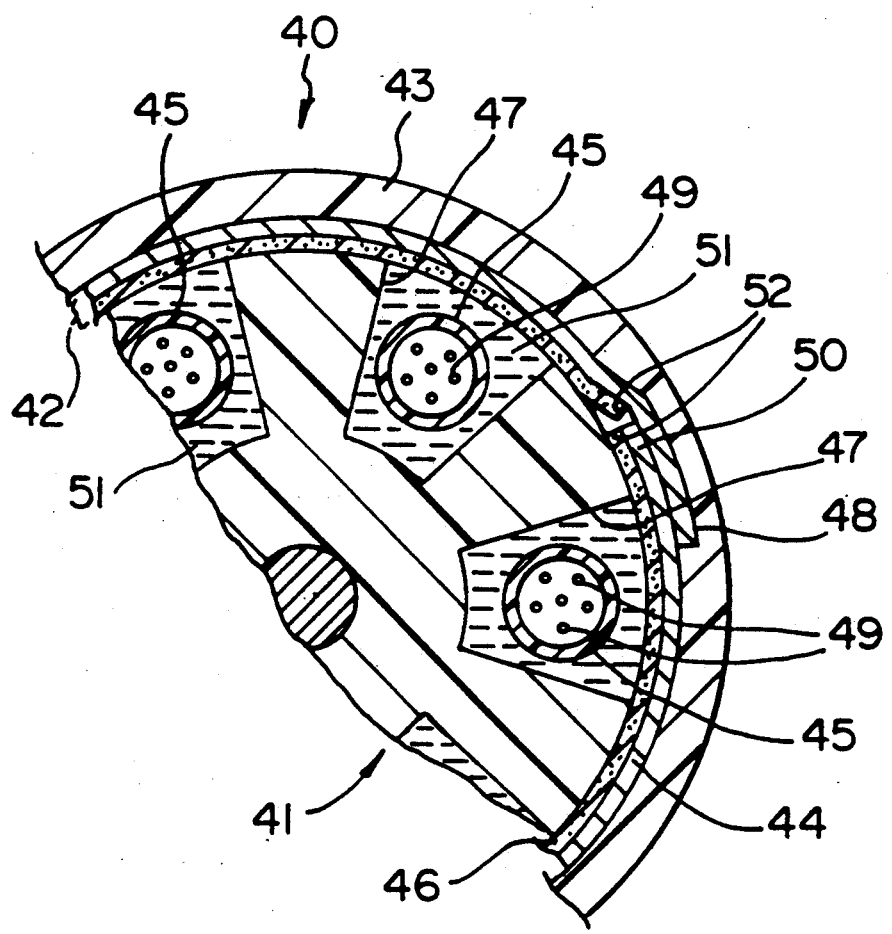
FIG. 4 is a cross-sectional view through the cable of FIG. 3 taken along line IV—IV in FIG. 3.

As shown in FIGS. 3 and 4, an optical cable 40 comprises a core 41 and a jacket 43 similar in construction to those described in the first embodiment. Flexible plastic tubes 45 are disposed within and extend along grooves 47 of the core, the tubes each housing a group of optical fibers 49 (FIG. 4). The space in each groove surrounding its tube 45 is occupied by a conventional water blocking grease or jelly 51 or a swellable water blocking powder such as described in U.S. Pat. No. 4,401,366 granted to T. Hope. Between the core 41 and the jacket 43 is provided a composite shield and water blocking tape structure 42 formed from a composite tape structure 42a (FIG. 6) forming a first embodiment of the invention. The tape structure 42 is comprised of two layers, i.e. an outer metal shield layer 44 and a radially inner layer 46 of swellable water blocking material, the two layers being bonded together. As shown particularly by FIG. 4, longitudinally extending edge regions 48 and 50 of the shield layer 44 overlap. The shield layer is coated completely over both sides with a plastic coating which is an ethylene copolymer. The confronting layers of ethylene copolymer at the overlapped edges 48 and 50 are fused together to provide a seal between the overlapped edges, the fusing together of the plastic layers being caused by a softening of the ethylene copolymer by heat provided during extrusion of the jacket 43 onto the shield. As can be seen from FIG. 4, the layer 46 of the water blocking material does not extend between the overlapped edges, but the edges 52 of the water blocking material substantially butt together. As may be seen from FIG. 3, no binding tape extends around the layer 46 of water blocking material.

The composite tape structure 42a of the first embodiment is manufactured and applied to the core 41 of the cable 40 to form the composite shield and water blocking structure 42 in the following manner.

Figure 5:
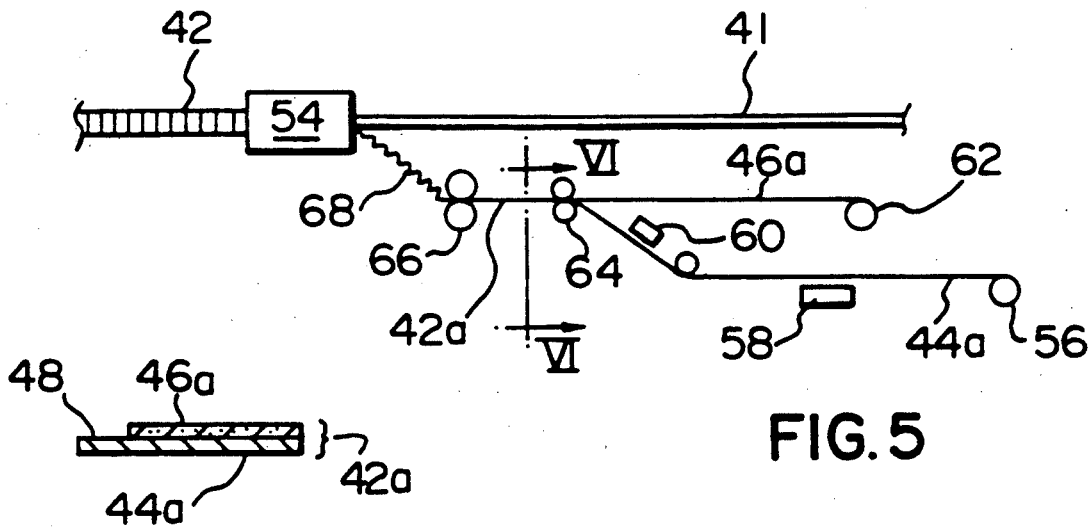
FIG. 5 is a diagrammatic side elevational view of apparatus for forming the composite tape structure of the first embodiment and applying it to a cable core during manufacture of the cable of the first embodiment.

As shown in FIG. 5, the core 41 is fed through a shield forming apparatus 54 of conventional structure. A metal tape 44a for forming the shield layer 44 is drawn from a reel 56 and is passed downstream past a welder 58 and a heater 60 towards the shield forming apparatus 54. Simultaneously with this, a tape 46a of the swellable water blocking material is unreeled from a reel 62 and is fed in the same direction. The swellable water blocking tape 46a is provided by a particulate swellable material, such as sodium polyacrylate, which is held upon a tape substrate or between substrates. The substrates are preferably non-woven and may be in the form of paper.

As the tape 44a passes beneath the heater 60, the heater softens the ethylene copolymer covering one side of the tape and the tape 44a bearing the softened ethylene copolymer passes between pinch rolls 64 together with the tape 46a from reel 62. The softened copolymer sticks to the tape 46a so that, after hardening of the copolymer, the two tapes 44a and 46a are bonded together. The composite tape structure 42a having two layers formed of the bonded tapes 44a and 46a then passes between corrugating rolls 66 where the metal tape layer 44a is formed with longitudinally extending corrugations 68 as shown in FIG. 5, the tape 46a being forced to conform to the corrugated shape of the metal. The corrugating process positively increases the degree of bonding between the two layers.

Figure 6:
FIG. 6 is a cross-sectional view taken along line VI—VI in FIG. 5 of the composite tape structure of the first embodiment.

The tapes 44a and 46a are of such relative widths and are relatively disposed so that when combined together to form the composite tape structure 42a as shown in FIG. 6, the water blocking tape 46a extends only partly across the one side surface of the metal tape 44a so that this one side surface is not obscured by the tape 46a at the longitudinally extending edge region 48 of the metal tape. Hence, as the composite tape structure 42a is wrapped around the core 41 as it passes through the shield forming apparatus 54, the longitudinally extending edge regions 48 and 50 overlap so that the ethylene copolymer coatings directly confront one another to enable the fusing process to take place between them. The width of the water blocking material tape layer 46 is such that the edges 52 substantially abut when assembled onto the core as described above and with reference to FIG. 4.

As may be seen from the first embodiment and with reference to FIG. 5, the use of binding heads, binding reels and binding tapes, such as are described in the prior art apparatus of FIG. 2, are completely unnecessary thereby avoiding disadvantages normally associated with use of binding tapes.

In use of the cable using the composite tape structure 42a of the first embodiment, the swellable water blocking layer 46 is successful in preventing moisture from passing along the inside surface of the metal shield layer 44. Contact of any portion of the layer 46 by moisture results in a swelling of the sodium polyacrylate material to provide its water blocking function by blocking all gaps between the shield layer and the core 41 and the water blocking substance 51 in the grooves.

Figure 7:
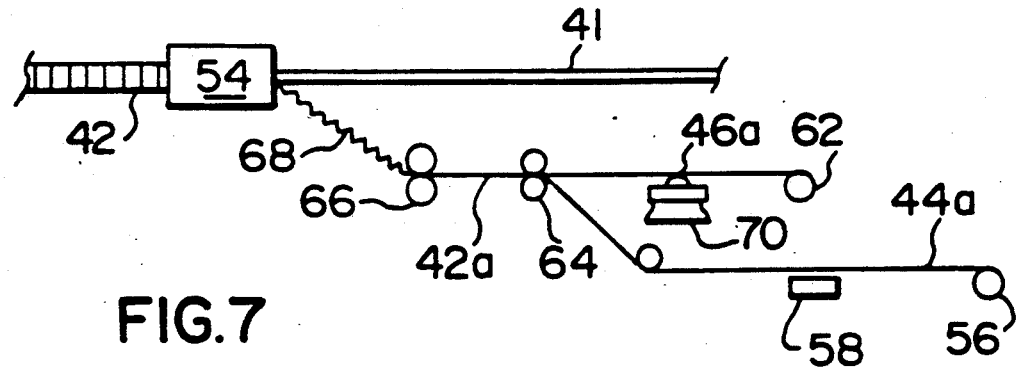
FIGS. 7 and 8 are diagrammatic side elevational views of apparatus for forming composite tape structures according to second and third embodiment and applying them to cable; cores during the manufacture of cables.

FIG. 7 shows an apparatus for the manufacture of a composite tape structure 42a of a second embodiment and for applying it to optical cable core. This structure 42a is of the same structure as that of the first embodiment with reference to FIG. 6 except that the ethylene copolymer does not adhere the tapes 44a and 46a together. In the structure of the second embodiment, the ethylene copolymer extends only along the surfaces of the tape 44a which provides the overlapping edge regions 48 and 50 of the shield layer 46 at which fusing is to occur between the coatings of the ethylene copolymer. In the apparatus shown in FIG. 7, to provide adherence between the two tape layers 44a and 46a, the tape 46a is passed over an adhesive applicator 70. A heater 60 such as described with reference to FIG. 5 is not included. Otherwise the apparatus is as described with reference to FIG. 5. As the tape 46a passes over the adhesive applicator 70, an adhesive is controllably coated onto the one surface of the tape 46a to provide adherence to the tape 44a. The adhesive may be any suitable adhesive for this purpose and needs to be compatible with the materials of the two layers. One suitable adhesive is that supplied by Minnesota Manufacturing & Machinery Limited under the trade name "Super 77". This adhesive is used is a vapor barrier adhesive in buildings for causing adherence between plastic vapor barrier sheets and wooden studs.

Figure 8:
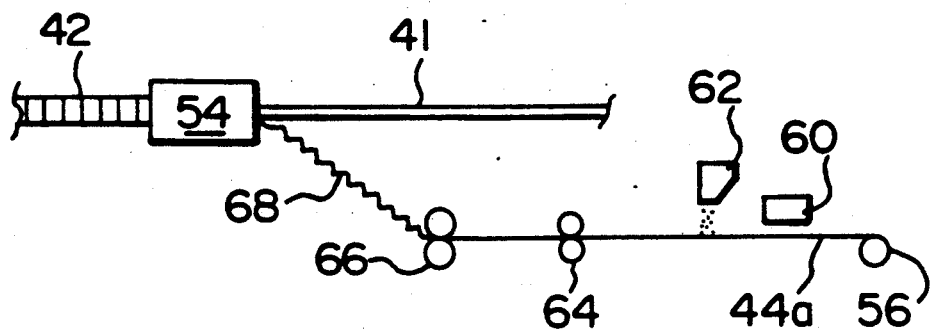

The apparatus shown in FIG. 8 is used in the manufacture of a composite tape structure of a third embodiment and for applying it to a cable. The structure of the third embodiment is substantially of the structure described with reference to the first embodiment except that the tape layer 46 of water blocking material is replaced by a layer of particulate sodium polyacrylate. In the apparatus of FIG. 8, the metal tape layer 44a passes from its reel 56 beneath a heater 60 as described in the first embodiment to soften the thermoplastic coating and then beneath a hopper 62 which supplies the particulate sodium polyacrylate material onto the softened copolymer as the tape passes beneath. The tape 44a bearing the particulate sodium polyacrylate then proceeds between the consolidating rolls 64 and the corrugating rolls 66 before proceeding to the shield forming apparatus 54.

Figure 9:
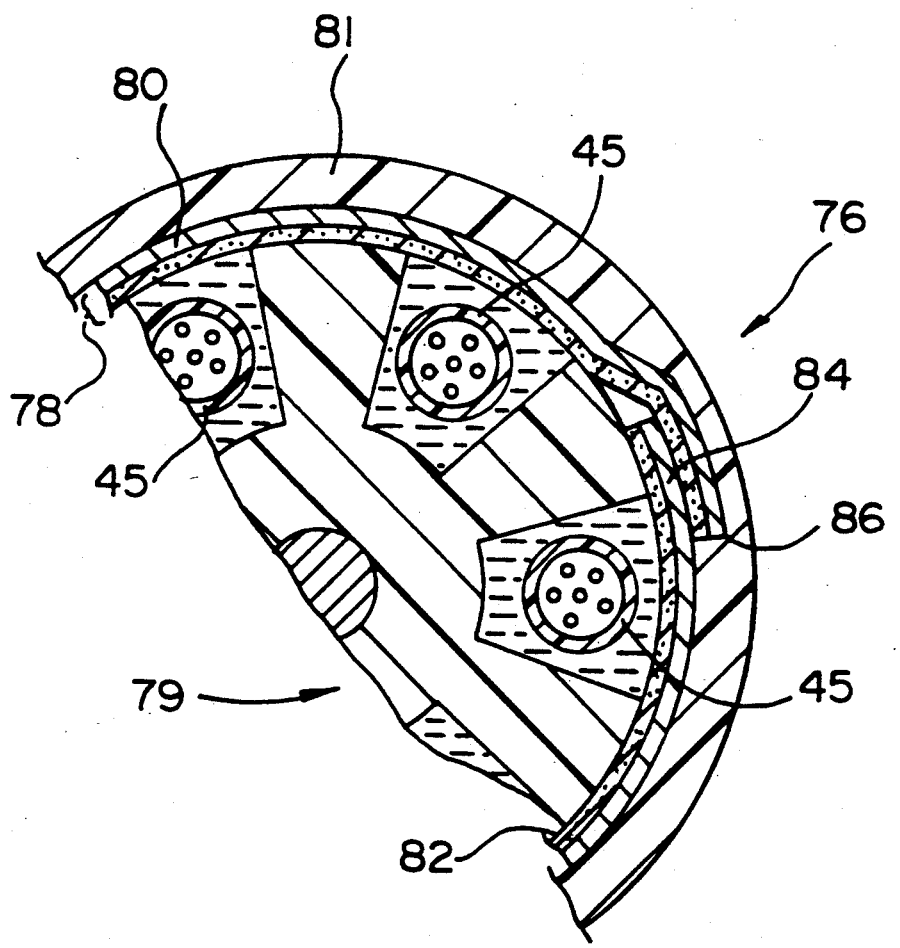
FIG. 9 is another cross-sectional view through a cable using a composite tape structure of a fourth embodiment.

In all of the above embodiments, the swellable water blocking material extends only partly across the metal tape 44a so that a longitudinally extending edge region of the metal tape is completely unobscured as shown in FIG. 6. However, as shown in FIG. 9, in a fourth embodiment, a composite tape structure which is basically of the structure shown in the first embodiment with reference to FIGS. 3 and 4 does not have the unobscured edge region. In the fourth embodiment, in an optical cable 76 a composite shield and water blocking tape structure 78 lying between a core 79 and a polymeric jacket 81 has a corrugated metal shield layer 80 and a layer 82 of swellable water blocking material lying radially within the metal shield layer with the two layers bonded together. As can be seen from FIG. 9, the two layers 80 and 82 are laterally coextensive so that the water blocking layer 82 extends between the overlapped longitudinally extending edge regions 84 and 86 of the metal shield layer. In this case, the edge regions 84 and 86 are not fused together as in the preceding embodiments. However, the interpositioning of the water blocking layer 82 between the edge regions 84 and 86 prevents the ingress of moisture between these edge regions and towards the cable core in that any moisture present beneath the jacket, upon contacting the edge of the layer 82 causes a swelling of layer 82 within the overlap to provide water blockage. The composite tape structure 78 of the cable may be constructed upon any of the apparatus described with regard to the first, second or third embodiments.

In modifications (not shown) of any of the above embodiments or any other embodiment to be described, composite shield and water blocking tape structure is of uncorrugated form so that the corrugating rolls 66 described in the apparatus are unnecessary. Further to this, in any embodiment or modification, the metal of the composite tape structure itself may be of any suitable material such as carbon steel or aluminum.

Further advantages which stem from the above embodiments are as follows. With regard to embodiments one to three inclusive, the composite tape structures provide tapes swellable water blocking in which overlap is avoided therefore reducing the cost of such an overlap. In addition, in all embodiments, because the two layers of material are bonded together, then the shield layer may be positioned more closely around the core than would be possible if the swellable water blocking material were applied to the core before application of the shield layer. As a result, cable diameters may be advantageously minimized. In addition to this, where swellable water blocking tape layers are used as in the first and second embodiments, these tape layers may have minimal strength in their supporting substrates merely relating to the unreeling process thereby minimizing the cost of such tapes.

Composite tape structures according to the invention and for providing the metal shield layer and the layer of swellable water blocking material may be preformed and is unreeled as a preformed composite tape structure for wrapping around the cable core. In the fifth, sixth and seventh embodiments to be described, manufacture of preformed tape structures are described.

Figure 10:
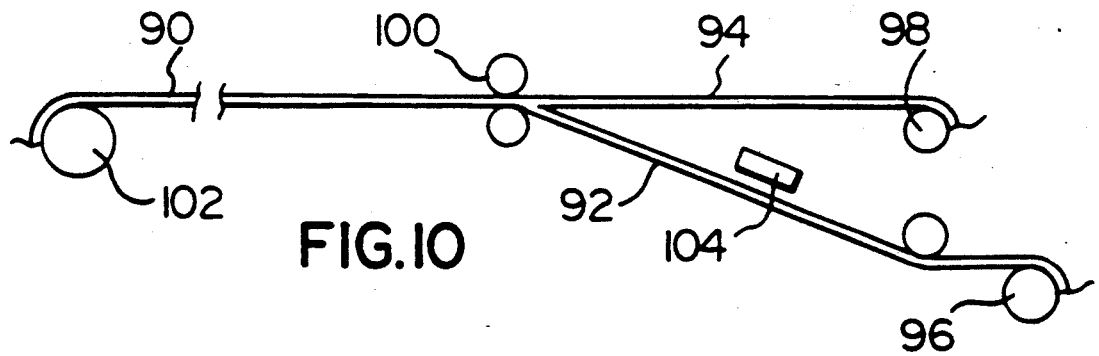
FIGS. 10, 11 and 12 are diagrammatic side elevational views of apparatus for the manufacture of composite tape structures according to fifth, sixth and seventh embodiments.

As shown in FIG. 10, in a fifth embodiment, a preformed composite tape structure 90 is composed of a metal tape layer 92 and a tape layer 94 of the swellable water blocking material. These tape layers are fed respectively from reels 96 and 98 between consolidating rolls 100 at which they converge to form the tape 90. The tape 90 is reeled onto a reel 102 for storage purposes and before being placed in an in-line apparatus for the manufacture of an optical cable. As shown in FIG. 10, the tape layer 92 has a coating of ethylene acrylic copolymer, on both of its surfaces as described in the first embodiment, and is fed beneath a heater 104 for softening the coating on one side of the layer 92 in a similar fashion to that described with reference to FIG. 5. The two tapes when passing between the consolidating rolls 100 bond together and the ethylene acrylic coating hardens to form a bond.

Figure 11:
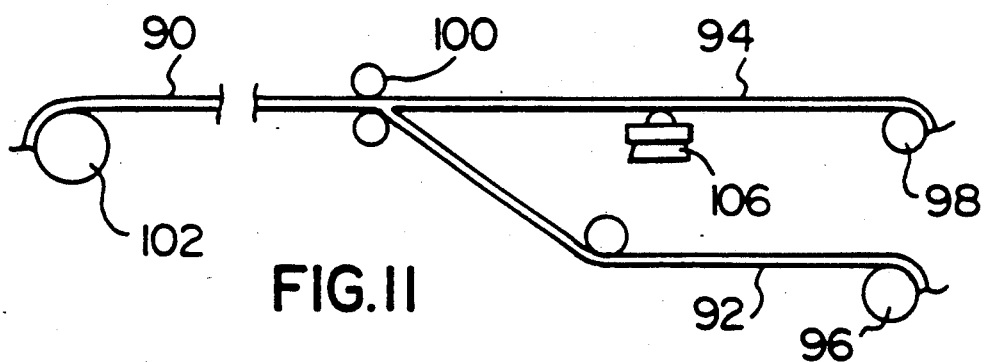

In a sixth embodiment as shown by FIG. 11 and using the same reference numerals as in FIG. 10 for like parts, the tape layer 94 is fed over an adhesive applicator 106 to apply adhesive to one side surface of the tape layer before passing the tape layers 92 and 94 between the consolidating rolls. In this case, the tape layer 92 need not have the ethylene acrylic copolymer covering the whole of each of its two sides.

Figure 12:
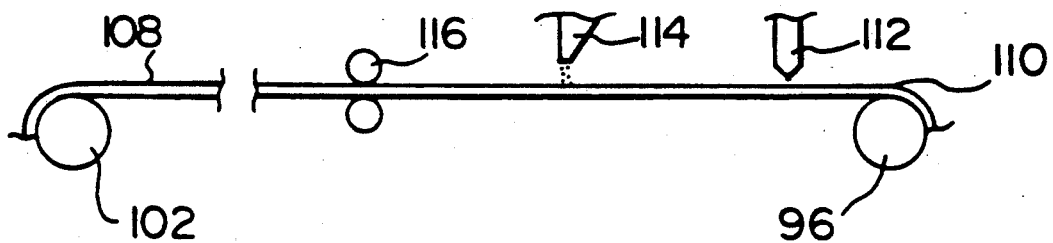

In a seventh embodiment as shown in FIG. 12, a composite tape 108 is formed from a metal tape layer 110 having a layer of sodium polyacrylate particulate material bonded to one of its surfaces. In this case, the metal tape layer 110 is provided with an adhesive from an adhesive applicator 112 before passing beneath a powder applicator 114 and then proceeding through consolidating rolls 116 to bond the particles to the one surface of the metal tape layer. Alternatively, the adhesive applicator 112 is replaced by a heater (not shown) for softening an ethylene acrylic layer on one side of the metal tape layer 110 so that the particles of sodium polyacrylate adhere to the softened layer.

In any of the embodiments five, six or seven, the swellable water blocking material may extend completely across the width of the metal tape layer or alternatively the metal tape layer may extend laterally beyond the water blocking material to provide an unobscured longitudinally extending edge region as shown in FIG. 6 for instance.

Figure 13:
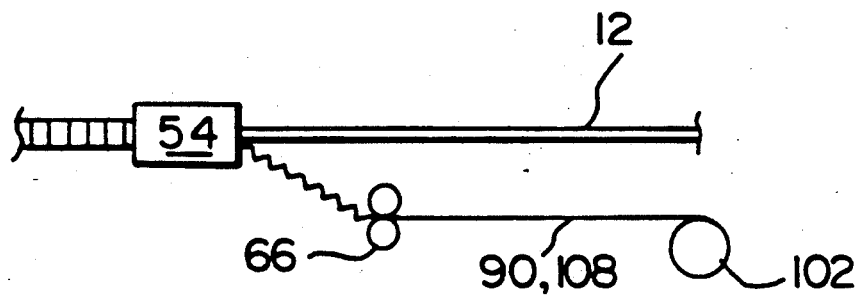
FIG. 13 is a diagrammatic side elevational view of apparatus for applying a composite tape structure to a cable core, the tape having been made upon the apparatus shown in any of FIGS. 10, 11 and 12.

In an eighth embodiment as shown in FIG. 13, an optical cable of the construction shown in any of the first to the fourth embodiments is provided upon apparatus having preformed tape structures 90 or 108 as described with reference to the fifth to seventh embodiments (FIGS. 10 to 12). As shown by FIG. 13, the tape structure 90 or 108 on the spool 102 is fed directly through corrugating rollers 66 and then through the shield forming apparatus 54, as described with regard to FIG. 5, before being wrapped around the core 12 for the cable.

What is claimed is:

1. A composite tape structure comprising a metal tape layer and a layer of swellable water blocking material, the metal tape layer having two major surfaces, and the two layers bonded together with the tape layer of water swellable blocking material extending along one of the major surfaces of the metal tape layer.

2. A composite tape structure according to claim 1 wherein the metal tape layer has a first and a second longitudinally extending edge regions spaced laterally of the metal layer, the layer of swellable water blocking material extending partly across said one major surface of the metal tape layer with the first longitudinally extending edge region of the metal tape layer being unobscured by the layer of swellable water blocking material, and one thermoplastic coating extends continuously along said one major surface at the unobscured first edge region and another thermoplastic coating extends continuously along the other major surface of the metal tape layer at the second edge region.

3. A composite tape structure according to either of claims 1 or 2 having laterally extending corrugations lying side-by-side longitudinally of the tape structure.

4. A method of making a composite tape structure comprising providing a metal tape layer having two major surfaces and causing a bond between the metal tape layer and a swellable water blocking material with the swellable water blocking material extending along and providing another layer on one of the major surfaces of the metal tape layer.

5. A method according to claim 4 wherein the metal tape layer has a first and a second longitudinally extending edge regions spaced laterally of the metal layer, the method comprising:

providing one thermoplastic coating upon said one major surface to extend continuously along said one major surface at the first edge region of the metal tape layer, and providing another thermoplastic coating upon the other major surface of the metal tape layer to extend continuously along said other major surface at the second edge region of the metal tape layer; and causing a bond between said one major surface of the metal tape layer and the swellable water blocking material with the first edge region of the metal tape layer extending laterally beyond the swellable water blocking material so that the thermoplastic coating on said one major surface at the first edge region of the metal tape layer is unobscured by the swellable water blocking material.

6. A method according to claim 5 comprising:

providing said one thermoplastic coating upon said one major surface so that the coating extends completely across said one major surface from edge-to-edge of the metal tape layer; and softening said one thermoplastic coating to provide an adhesive between the one major surface of the metal tape layer and the swellable water blocking material.

7. A method according to either of claims 4 or 5 comprising forming the bonded together layers with laterally extending corrugations lying side-by-side longitudinally of the tape.

* * * * *